United States Patent [19]

Storck

[11] Patent Number: 4,742,720

[45] Date of Patent: May 10, 1988

[54] REFERENCE PLATFORM FOR MOTOR VEHICLE OPERATION

[75] Inventor: Karlheinz Storck, Mühltal, Fed. Rep. of Germany

[73] Assignee: Carl Schenck AG, Fed. Rep. of Germany

[21] Appl. No.: 20,078

[22] Filed: Feb. 27, 1987

[30] Foreign Application Priority Data

Mar. 4, 1986 [EP]  European Pat. Off. ........ 86102839.7

[51] Int. Cl.⁴ ............................................. G01M 19/00
[52] U.S. Cl. ................................. 73/865.9; 73/118.1
[58] Field of Search ................. 73/865.9, 118.1, 117.2

[56] References Cited

U.S. PATENT DOCUMENTS 3,889,527  6/1975  Wallace .............................. 73/118.1
4,672,844  6/1987  Meyer ............................ 73/118.1 X

FOREIGN PATENT DOCUMENTS 3,303,588  8/1983  Fed. Rep. of Germany.
779849  11/1980  U.S.S.R. .............................. 73/865.9

Primary Examiner—Tom Noland
Attorney, Agent, or Firm—Connolly and Hutz

[57] ABSTRACT

A stable reference platform is securely anchored within the passenger compartment of a motor vehicle. The positioning and anchoring of the platform is accomplished without removing or engaging the passenger seat, and in a manner which avoids soiling and/or damage to the passenger compartment. The reference platform functions to support devices used to automatically operate the vehicle during testing thereof.

9 Claims, 2 Drawing Sheets

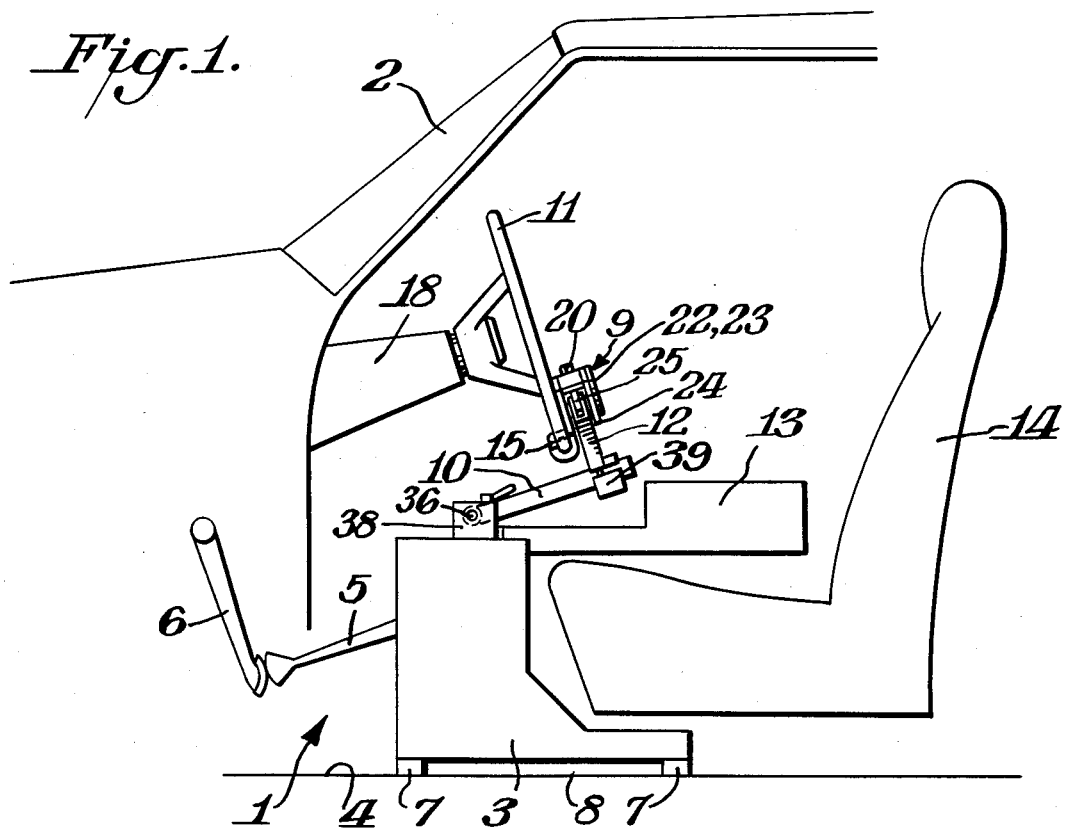
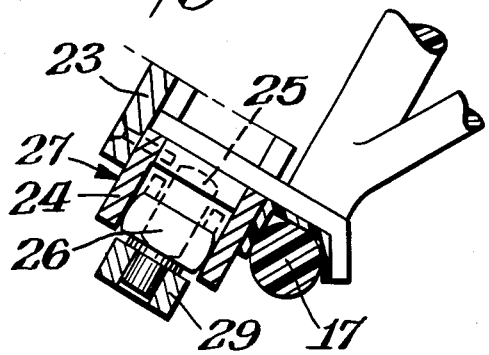
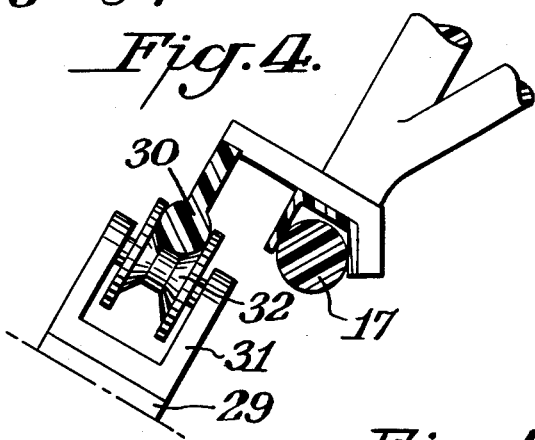
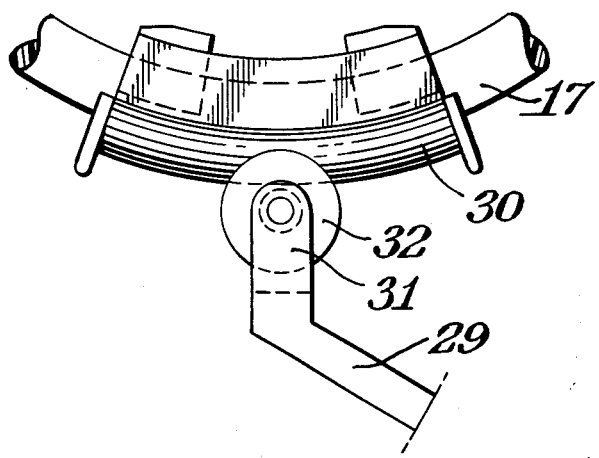

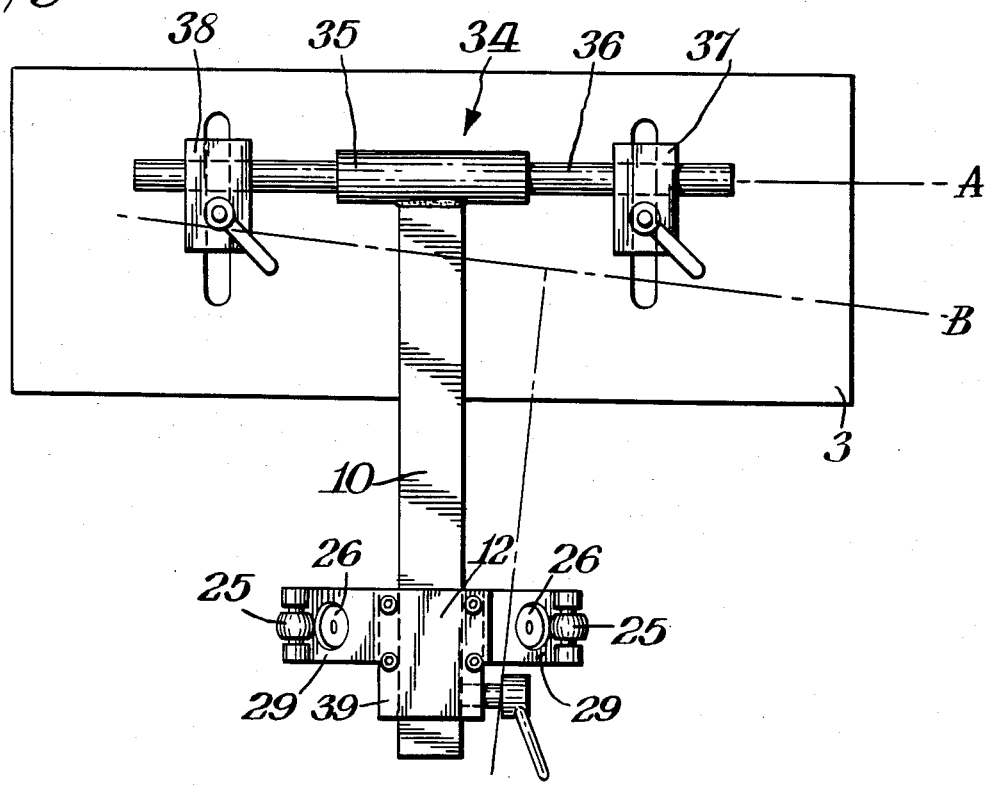
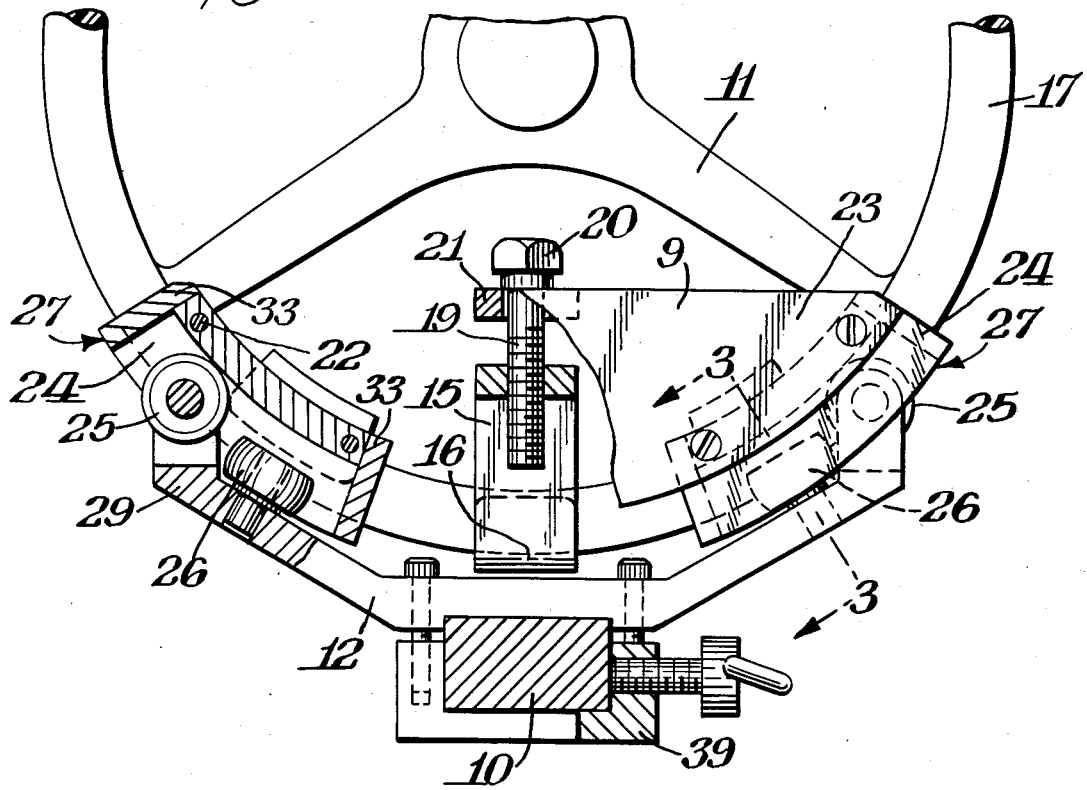

REFERENCE PLATFORM FOR MOTOR VEHICLE OPERATION

BACKGROUND OF THE INVENTION

The present invention relates to a reference platform for the lockable positioning and orientation of operation and/or measurement units inside the passenger compartment of a motor vehicle.

For monitoring the function of a motor vehicle, especially for the control of emission values, motor vehicles are routinely investigated on chassis dynamometer test stands. Aside from monitoring emission values which are measured at various speeds which must be driven on the chassis dynamometer test stand, it is part of such function of monitoring of motor vehicles to check the acceleration and the ability to shift gears. In order to obtain reproducible comparison values between various vehicles of a given production series and also in order to obtain comparison among individual series, automatic drivers are being increasingly used instead of test persons to take on the function of clutching, engaging gears, accelerating, braking and driving at predetermined speeds.

Such automatic drivers must be placed in the passenger compartment and, in order to properly function, they must be, as much as possible, placed in the same position within each passenger compartment. In the past, this has been accomplished by removing the driver's seat from the passenger compartment and substituting in its place the automatic driver unit connected to the mounting pad of the driver's seat. Such an installation in the passenger compartment guarantees a safe and stable positioning of the automatic driver. However, it is very time consuming because in addition the driver's seat must be removed in one operation and must be reinstalled in another operation. Although stable mounting is achieved, such positioning represents an additional time expenditure that must be accepted as "given" within the framework of the increased through put of motor vehicles to be tested.

Another method of positioning of automatic drivers in the passenger compartment consists of placing the unit upon the driver's seat with support on the back of the seat and with lateral orientation by means of sheet metal guides along the outer edges of the seat upholstery. While the time expenditure for removal and reinstallation of the driver's seat is avoided, the danger of soiling the driver's seat with the automatic driver cannot be excluded. A significant disadvantage, however, is encountered by the fact that stable positioning of the automatic driver unit upon the upholstery of the driver seat is not possible.

SUMMARY OF THE INVENTION

With the above as background, the present invention functions to position and lock in place the control and/or measuring units for automatic vehicle operation in a reproducible position within the passenger compartment of a motor vehicle without removing the driver's seat.

By positioning and fastening a support plate with guides upon the steering wheel, a reproducible point of orientation is created for all measurements. This guarantees proper positioning and operation of the control and/or measuring units and proper interaction between these units and car control levers such as the brake, clutch and accelerator pedals. Additional adjustments for vehicles of the same series are unnecessary because the reference platform holding the measuring and/or control units is always properly oriented. This results from the interaction of the support plate of the reference platform and its point of attachment to the lower apex of the steering wheel.

The point of orientation and mounting of the support plate to the steering wheel is easily accomplished even in those cases where the steering wheel is out of round. In these cases it is not necessary to expend additional efforts for the replacement of such steering wheels with temporary steering wheels of the control of the vehicle or measurements thereof.

BRIEF DESCRIPTION OF THE DRAWING

Novel features and advantages of the present invention in addition to those noted above will become apparent to those of ordinary skill in the art from a reading of the following detailed description in conjunction with the accompanying drawing wherein:

FIG. 1 is a schematic side elevational view of a control and/or measuring unit with a reference platform according to the present invention;

FIG. 2 is a fragmental front elevational view of the connecting and support plates of the control unit shown in FIG. 1;

FIG. 3 is a cross-sectional view taken along line 3—3 of FIG. 2;

FIG. 4 is a view similar to FIG. 3 but showing an alternate embodiment of the invention herein;

FIG. 5 is a partial front elevational view of the alternate embodiment shown in FIG. 4; and FIG. 6 is a top plan view of the holding arm of the present invention.

DETAILED DESCRIPTION OF THE INVENTION

Referring in more particularity to the drawing, an operational and/or control measurement unit 3 is positioned on the floor 4 of footspace 1 of a motor vehicle 2. An actuation mechanism 5 is connected to and extends from unit 3 for operating the vehicle. In factuality, pedal 6 may be the brake, the clutch or the accelerator. Also, it is possible to have a separate actuating mechanism 5 for each pedal 6 of the vehicle.

Control unit 3 is equipped with the maximum size possible base plate 8 which can be inserted into the foot space 1 of the vehicle without damaging the door openings. Base plate 8 is supported by feet 7 that engage floor 4 of the vehicle and also by a reference platform 9 and holding arm 10 which interact with the steering wheel 11 of motor vehicle 2.

As shown in FIG. 1, holding arm 10 has transverse axis freedom with respect to unit 3 while it is connected on its other end to connecting plate 12 which in turn is guided inside the reference platform 9.

Further, as shown in FIG. 1, a device 13 can be added to unit 3 which extends over the seating area of the driver's seat 14 without loading same. As a result, seat 14 remains in the vehicle and does not have to be removed therefrom.

FIG. 1 schematically shows the simplest embodiment of the invention whereby it is possible to achieve a reproducible positioning of certain control units and actuation linkages without first removing the vehicle seat. FIG. 1 further shows that not only one control unit may be positioned by means of the reference platform 9 according to the invention inside the passenger compartment of the motor vehicle, but that utilizing the remaining passenger compartment further coordinated devices may be installed without being supported by or on the driver's seat.

As a result of the ability, according to the invention, of the holding arm 10 to swivel and rotate, a flat floor is not necessary for the unit 3. As a result of the fixed point of orientation created by the reference platform 9 a reproducible positioning of the unit 3 or other devices inside the motor vehicle can be achieved.

The reference platform according to the invention is represented in FIG. 2 and consists of a support clamp 15 connected to the lower apex 16 of the wheel rim 17. The support clamp 15 has a threaded opening therein which receives a threaded rod 20 carried by a fitting 21 secured to support plates 22, 23. Turning of the threaded rod 20 tensions the hold of the support plates 22, 23 on the wheel rim 17. As explained more fully below, plates 22, 23 include guideways 24 for guiding rollers 25, 26 of connecting plate 12.

As shown in FIG. 2, the rod pulls the clamp 15 against the outside of the wheel to thereby sandwich the wheel between clamp 15 and structure on the support plates 22, 23 downwardly depending on the inside of the wheel.

As a result of the flexible guidance of the connecting plate 12 on the support plates 22, 23, the steerability for the vehicle within the range of interest for chassis roll tests is not diminished. As a result of the ability of the holding arm to swivel and to rotate, a preselected pressure between the connecting plate 12 and the reference platform 9 can easily be achieved in radial and in axial directions. The holding arm 10 is held in a support 39 on the connecting plate 12. The support 39 can be locked to the arm 10 by means of a quick connect coupling 50.

FIG. 3 shows a grooved guideway 27 according to the invention on the support plates 22, 23. The grooved guideway 27 guides a spherically shaped guide roller 26 which is placed on a guide arm 29 that extends circumferentially.

FIGS. 4 and 5 show the guide system arranged on support plates 22, 23 in the form of a torus guide 30. In this case, the end of the guide arm 29 is widened to make a fork so that in this fork 31 may be arranged a roller with running groove 32 which contacts the torus guide 30 and thus also can provide guidance for the connecting plate in axial as well as in radial directions. Instead of a roller with a running groove 32 within the fork 31, rolls with smooth surfaces may also be arranged, the axes of which cross at an angle of for instance 90° and that roll along the torus guide.

It is not necessary to extend the groove guide or the torus guide beyond the lower semicircle of the steering wheel because the steering movements of the steering wheel during chassis roll tests correspond to only 50 to 150 millimeters of the steering wheel circumference. Also, only in this segment is guidance required, and it is provided either in groove or torus form. At the end of the guide segments, lock stops 33 may be installed to prevent further movements of the steering wheel. As shown best in FIGS. 3-5, the guides 27 and 30 are shifted in the axial direction with respect to the wheel rim. Furthermore, the reference platform may also be attached to steering wheels that are out of round or eccentric to the steering column because the guides 24 for the connecting plate 12 are arranged concentric to the steering column.

FIG. 6 shows the holding arm 10 connected at one end to connecting platform 12 and that, by means of guide rollers 25, 26, it is guided in the reference platform 9, and it is oriented toward same. The opposite end 34 of the holding arm 10 carries a guide 35 for the cross beam 36. Two movable holders 37, 38 are releasably secured to the cross beam and each is connected to unit 3. As shown in FIG. 1, the cross beam 36 may be in the form of a rod, and shifting the holding arm 10 in the direction of connecting plate 12 enables adjustment of the pressure between connecting plate 12 and reference platform 9.

The control unit 3 may be operated to shift the holders 37, 38 connected to unit 3 from the positions shown in FIG. 6 along line A to positions along line B. Such movement reorients holder arm 10 which in turn manipulates steering wheel 11.

What is claimed is:

1. A reference platform for lockably positioning and orienting control and/or measuring units within the passenger compartment of a motor vehicle comprising a support plate assembly releasably attached to a vehicle steering wheel at the lower apex thereof, spaced apart guideways connected to the support plate assembly on opposite sides of the lower apex of the steering wheel, a connecting plate movably connected to the support plate assembly, the connecting plate having rollers in engagement with the guideways, a control unit positioned within the passenger compartment, and a holding arm connected between the control unit and the connecting plate for manipulating the steering wheel in response to movements of the control unit.

2. A reference platform as in claim 1 wherein the support plate assembly includes portions positioned on the inside surface of a steering wheel rim, a clamping element having a portion thereof positioned on the outside surface of the rim, and means for urging together the clamping element and the assembly portions on the inside of the steering wheel rim to thereby releasably secure the assembly to the rim.

3. A reference platform as in claim 2 wherein the support plate assembly is symmetrically arranged on opposite sides of the lower apex of a steering wheel.

4. A reference plateform as in claim 2 wherein the clamping element is positioned at the lower apex of a steering wheel.

5. A reference platform as in claim 2 wherein the guideways of the support plate assembly are U-shaped grooves.

6. A reference platform as in claim 2 wherein the guideways of the support plate assembly are torus shaped guides.

7. A reference platform as in claim 1 wherein the connecting plate includes a pair of guide arms each extending outwardly from the holding arm in opposite directions, and wherein the rollers include at least one roller connected to each guide arm cooperating with the spaced apart guideways of the support plate assembly, each of the guideways having a U-shaped configuration with the rollers positioned therein.

8. A reference platform as in claim 1 wherein the connecting plate includes a pair of guide arms each extending outwardly from the holding arm in opposite directions, and wherein the rollers include at least one roller connected to each guide arm cooperating with the spaced apart guideways of the support plate assembly, each of the guideways having a torus shape and the rollers each having a V-shaped circumferential groove that engages the torus guideways.

9. A reference platform as in claim 1 wherein the holding arm has a guide at the end thereof opposite the connecting plate, a cross beam slidably connected to the holding arm guide, and movable holders at the ends of the cross beam connected between the cross beam and the control unit whereby movements of the control unit are transmitted to the cross beam and holding arm guide via the movable holders.

* * * * *